Feb. 18, 1964 O. A. MOORE 3,121,313
CONTROL SYSTEM FOR IRRIGATION DITCH DIVERSION FLOW
Filed April 29, 1959 5 Sheets-Sheet 1

INVENTOR.
Orval A. Moore
BY WHITEHEAD, VOGL & LOWE
ATTORNEYS

Feb. 18, 1964     O. A. MOORE     3,121,313
CONTROL SYSTEM FOR IRRIGATION DITCH DIVERSION FLOW
Filed April 29, 1959     5 Sheets-Sheet 2

INVENTOR.
Orval A. Moore
BY WHITEHEAD, VOGL & LOWE
PER Frank C. Lowe
ATTORNEYS

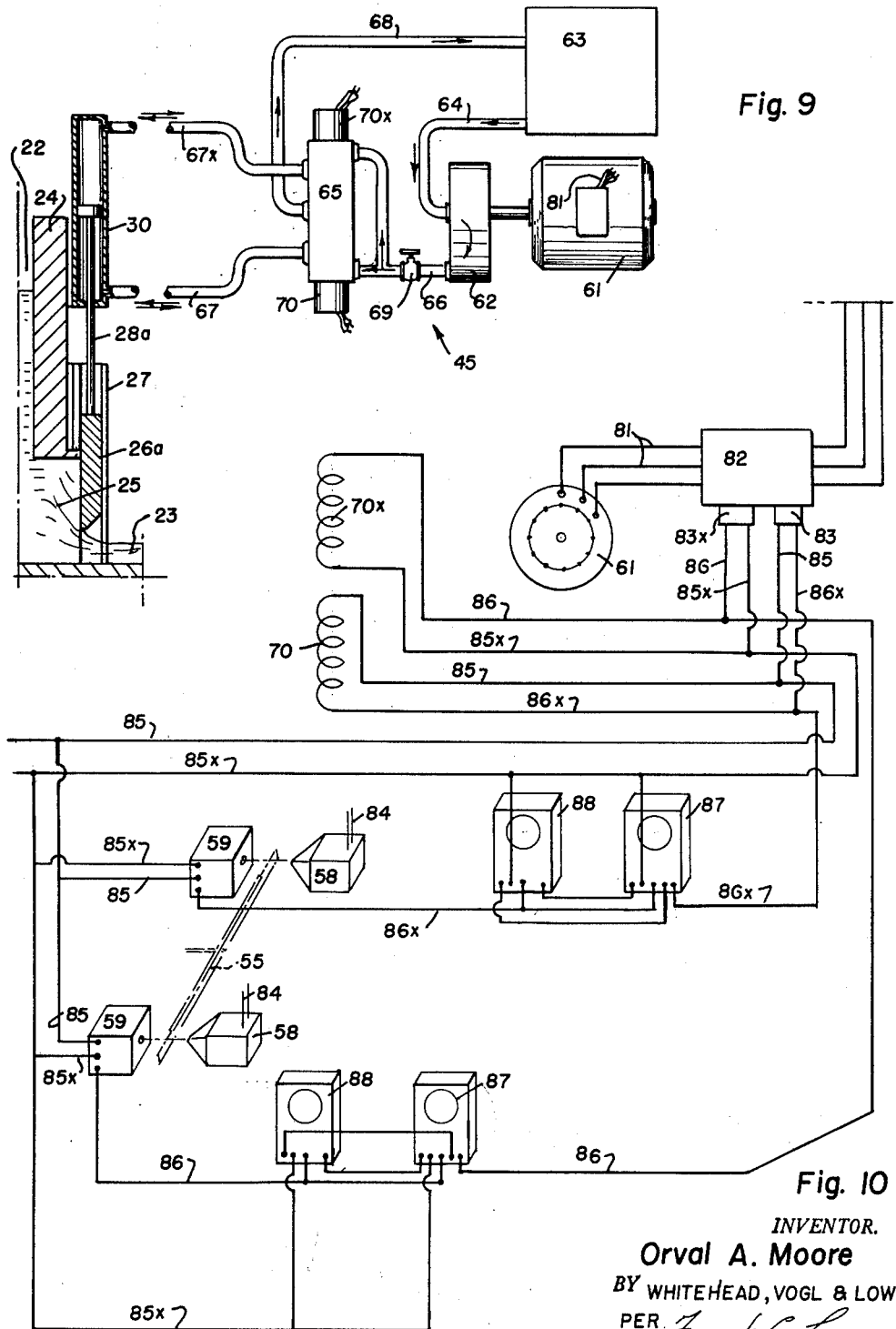

Feb. 18, 1964     O. A. MOORE     3,121,313
CONTROL SYSTEM FOR IRRIGATION DITCH DIVERSION FLOW
Filed April 29, 1959     5 Sheets-Sheet 4

INVENTOR.
Orval A. Moore
BY WHITEHEAD, VOGL & LOWE
PER Frank C. Lowe
ATTORNEYS

Feb. 18, 1964 — O. A. MOORE — 3,121,313
CONTROL SYSTEM FOR IRRIGATION DITCH DIVERSION FLOW
Filed April 29, 1959 — 5 Sheets-Sheet 5

INVENTOR.
Orval A. Moore
BY WHITEHEAD, VOGL & LOWE
PER Frank C. Lowe
ATTORNEYS

United States Patent Office 3,121,313
Patented Feb. 18, 1964

3,121,313
CONTROL SYSTEM FOR IRRIGATION DITCH
DIVERSION FLOW
Orval A. Moore, Fort Collins, Colo.
(2901 10th St., Greeley, Colo.)
Filed Apr. 29, 1959, Ser. No. 869,676
3 Claims. (Cl. 61—23)

This invention relates to control systems for hydraulic flow and more particularly to systems for the control of flow in open channels, a primary object of the invention being to provide a novel and improved method and apparatus for regulating a diversion of flow from a supply channel or river and into a diversion channel or ditch, the invention being hereinafter referred to as a control system, the supply channel as a river and the diversion channel as a ditch, although it is to be understood that such designations are not restrictive in application of the invention.

Another object of the invention is to provide a novel and improved control system for regulating a discharge or flow into a diversion ditch to maintain a selected discharge rate in the ditch regardless of variations in the water supply and water level at the head of the ditch.

Another object of the invention is to provide a novel and improved control system for regulating the diversion of flow from a supply channel or river into a diversion channel or ditch to automatically and accurately divert an allocated flow from the river into the ditch as, for example, in accordance with a lawfully decreed right of diversion from the river.

Another object of the invention is to provide a novel and improved control system for regulating a variable flow into a bifurcated channel system to maintain a selected constant flow in one lateral of the system and to bypass the varying remainder of the variable flow into the other lateral of the system.

Another object of the invention is to provide a novel and improved control system for regulating the flow and maintaining a selected discharge rate from the forebay of a diversion dam into a diversion ditch regardless of variations of the water level in the forebay at the head of the channel.

Another object of the invention is to provide a novel and improved control system for regulating the diversion of flow from a river and into an irrigation ditch in strict accordance with a lawfully decreed right of diversion from the river to either take a constant rate of flow into the ditch from the river and permit the remainder to pass, or to permit a constant rate of flow to pass down the river and to take any excess flow into the ditch that might exist.

Yet other objects of the invention are to provide, in an improved control system for regulating diversion of flow from a river and into a diversion ditch, an arrangement of elements which is simple and economical in construction, easy to operate and maintain and reliable and trouble free.

With the foregoing and other objects in view, all of which more fully hereinafter appear, my invention comprises certain novel and improved constructions, combinations and arrangements of parts and elements, and of operations, sequences and steps, all as hereinafter described, defined in the appended claims and illustrated in preferred embodiment in the accompanying drawing, in which:

FIGURE 9 is a mechanical diagram of a sectional view of a headworks control gate and of other mechanical elements incorporated therewith which are generally viewed from the indicated arrow 9 at FIG. 8.

FIGURE 10 is an electrical circuit diagram which interconnects the various selectors, timers and operational controls of the apparatus.

Figure 1:
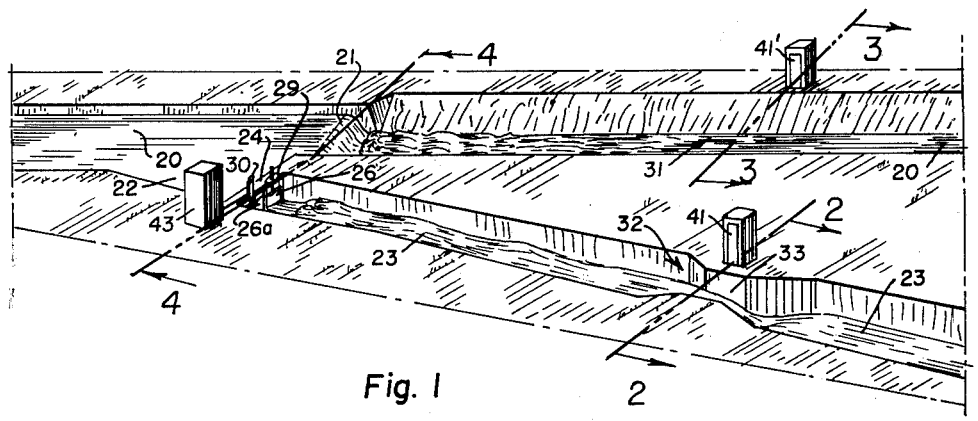
FIGURE 1 is a perspective view, somewhat diagrammatic in nature, of a river channel and ditch diversion channel, and the diversion headworks in the river, and including such conventional flow regulating and measuring apparatus which is used in connection with the invention, all in an arrangement which is especially adapted to be modified to accommodate the present invention.
Figure 2:
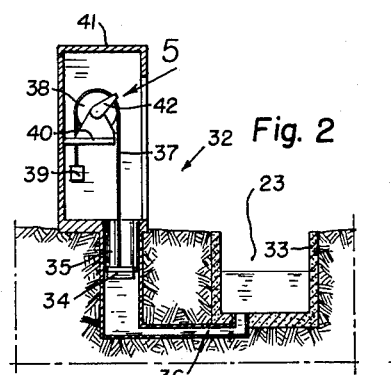
FIGURE 2 is a transverse, sectional, somewhat diagrammatic view of a flow gaging station in one branch of the channel system illustrated at FIG. 1, as taken from the indicated line 2—2 at FIG. 1, but on an enlarged scale.

FIGURES 12, 13, 14 and 15 are representative diagrams of relationships between water flow in the river, controlled water flow in the diversion ditch channel and control gate movement with respect to time as when changes in the rate of flow of the river occur and when the flow in the diversion channel is maintained at a substantially constant rate, all to illustrate the method of operation of the apparatus in accordance with the principles of the invention.

In the arid western states where irrigation is necessary the flow of most rivers is diverted to irrigation ditches and many irrigation ditch systems are capable of diverting the entire available river flow during the summer months. Because of a recurring water shortage each season in many localities a law of water diversion has been developed based upon rights of appropriation to establish priority of the use of the available water. District engineers, water masters or other officials administer such laws permitting each irrigation ditch to divert selected amounts of water from the river or supply channel according to its priority right. The senior appropriator may divert his allotted priority first and then the junior appropriators may divert. Each junior irrigation ditch must bypass whatever flow is required for senior ditch downstream before it can divert at all. However, when a ditch is diverting its allotted flow it must then bypass any excess for the benefit of the junior priority holders downstream. In any extensive system of irrigation ditches the manager of each irrigation ditch is informed at all times by the state engineer or by proper authority as to the amount of flow he can divert or bypass.

It follows that the diversion flow of an irrigation ditch is according to one of two possible conditions: either to divert a selected steady flow from the river and bypass the remainder of the flow down the river, or to bypass down the river a selected steady flow and divert into the ditch whatever is left. To do this flow gaging stations are located in the river and in the irrigation ditch downstream from the point of diversion to enable the ditch operator to properly set the diversion gates or like controls at the ditch headgate.

Such would be a simple procedure were it not for the fact that there is usually a constant changing of the river flow which, in turn, requires constant changing of those gate settings which regulate the diversion flow into the irrigation ditch. This need for constant attention exists whether the irrigation ditch is taking all or only part of its decreed amount of water, as when the river flow supply is deficient. Heretofore, a number of regulating devices have been developed in order to simplify the chore of controlling the diversion flow in the face of river variation and to minimize the need for constant attention at the control gate of the irrigation ditch. A common mode of regulation is to establish flow measurements at the forebay regulating gate whenever the drop in elevation at the forebay is sufficient to prevent undesirable backwater conditions at the gate control. The success of such devices has generally been indifferent and at best a control will work in one installation but for some unknown reason will not work at another installation.

It was with such in view that the present invention was conceived and developed, and comprises, in essence, an automatic control system for a diversion works such as at the gate of an irrigation ditch to automatically regulate the control gate, or an equivalent control, to maintain a selected diversion of the river flow into the ditch at all times. The invention also comprises a method for controlling a diversion flow by a time-delayed response to a flow measurement indication, all as hereinafter set forth in detail.

Referring more particularly to the drawing, a typical diversion works is illustrated at FIGS. 1 to 4 where the river channel 20 is interrupted by a weir 21. The channel is widened upstream from this weir and the water backs up to provide a forebay 22. A lateral channel or irrigation ditch 23 heads at a wall 24 at the forebay which separates the ditch from the forebay to form the diversion headworks. A control diversion of flow into the ditch is through on or more gate passageways 25 through the wall 24 which are covered by gates 26 and 26a.

In the drawing these gates are rectangular members mounted at the downstream face of the wall 24, but it is to be understood that such is merely illustrative for the gates are often mounted at the upstream face of the wall 24 and their form may be other than rectangular. Regardless, the gates move vertically in tracks 27 carried by the wall 24. In the illustration one gate 26 includes a lifting stem 28 which upstands therefrom to extend to the top of the wall 24 and is connected to a lift wheel 29 which is operated manually. The other gate 26a however, includes a piston stem 28a which upstands therefrom to extend to the double acting cylinder 30 for mechanical operation in connection with the invention as hereinafter set forth. It is contemplated that where two or more gates are at the headworks a mechanical gate lift control will be used at one or more of the gates as the basic means for regulation of the flow into the ditch 23 and that the other gate or gates having manual lifts will be used only for supplementary settings of a somewhat permanent nature and in describing the invention it will be assumed that the manually operated head gates will remain closed or at a fixed setting and hence will not be considered further.

Figure 3:
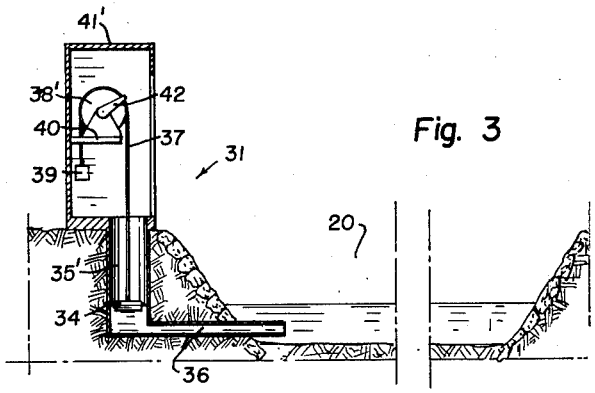
FIGURE 3 is a transverse, sectional, somewhat diagrammatic view of a flow gaging station in the other branch of the channel system, as taken from the indicated line 3—3 at FIG. 1, but on an enlarged scale and with channel portions broken away to conserve space.
Figure 4:
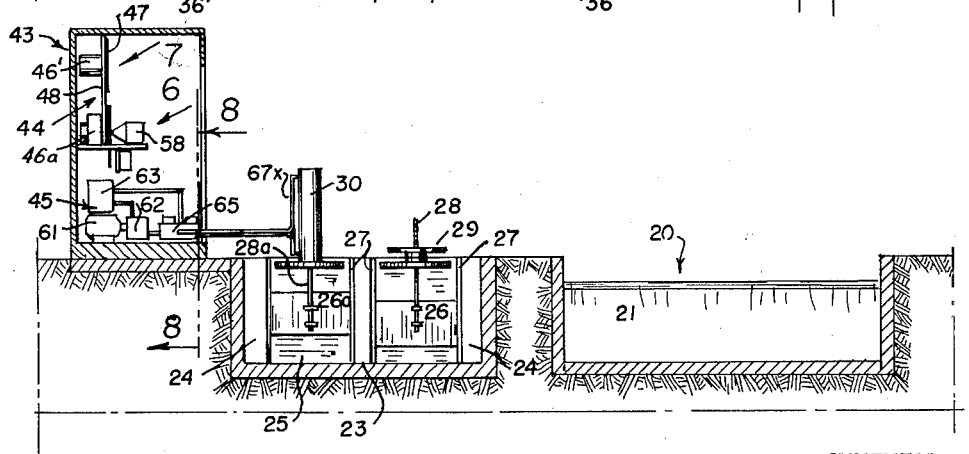
FIGURE 4 is a transverse, sectional, somewhat diagrammatic view of the headworks of the system, looking upstream to illustrate a control station in section and an elevational view of the gate controls in the diversion ditch and a weir control in the river channel, all as taken from the indicated line 4—4 at FIG. 1, but on an enlarged scale.

A flow gaging station 31 is located in the river 20 downstream from the weir 21 a distance sufficient to permit turbulent flow over the weir to iron itself out. A flow gaging station 32 is also located in the ditch 23 downstream from the gates 26 and 26a a distance sufficient to permit turbulent flow through the gates to iron itself out. Where the flow conditions are satisfactory, as generally in a river, the gaging station 31 may be operated by simple measurement of the water level in the channel as illustrated in FIG. 3. However, where the gradient is comparatively flat as in an irrigation ditch, the ditch section may have to be modified by inclusion of narrowing structure such as a Parshall flume 33 in order to permit effective measurement of the water level therein.

The practical method of flow measurement in a ditch and river is to measure the water level of the channel. This measurement is accomplished in both instances by a float 34 in a well 35 and 35' along the ditch bank and river channel respectively which communicates with the respective channels of the ditch or river by a side to pipes 36 and 36'. The float position indicating water level in each arrangement is determined by the sounding line 37 which extends upwardly from the float and over a horizontally axised wheel 38 to depend from the opposite side of the wheel under constant tension by a counterweight 39 connected to its depending terminal end. The axles of the respective wheels 38' are mounted in suitable bearings in bases 40 in shelter sheds 41 and 41' over the respective wells 35 and 35'. The wheel and line 37 are suitably calibrated and marked to register flow rates which are indicated by a pointer 42 mounted upon the frame 40 in accordance with conventional practice.

The gaging stations are necessarily remote from the diversion headworks at the forebay in order to measure an ironed out flow. However, to control the flow at the gates by a mechanical gate lift it is desirable to provide machinery close to the mechanically lifted gate 26a as in a shelter 43 which constitutes a central control station. It follows that the basic movements of a float 34 must be transmitted to this control station to a regulator apparatus 44 so that the gate lifting machinery 45, hereinafter described, may be operated to raise or lower the gate 26a according to an established program of operation.

Figures 5, 6, 7, 8:
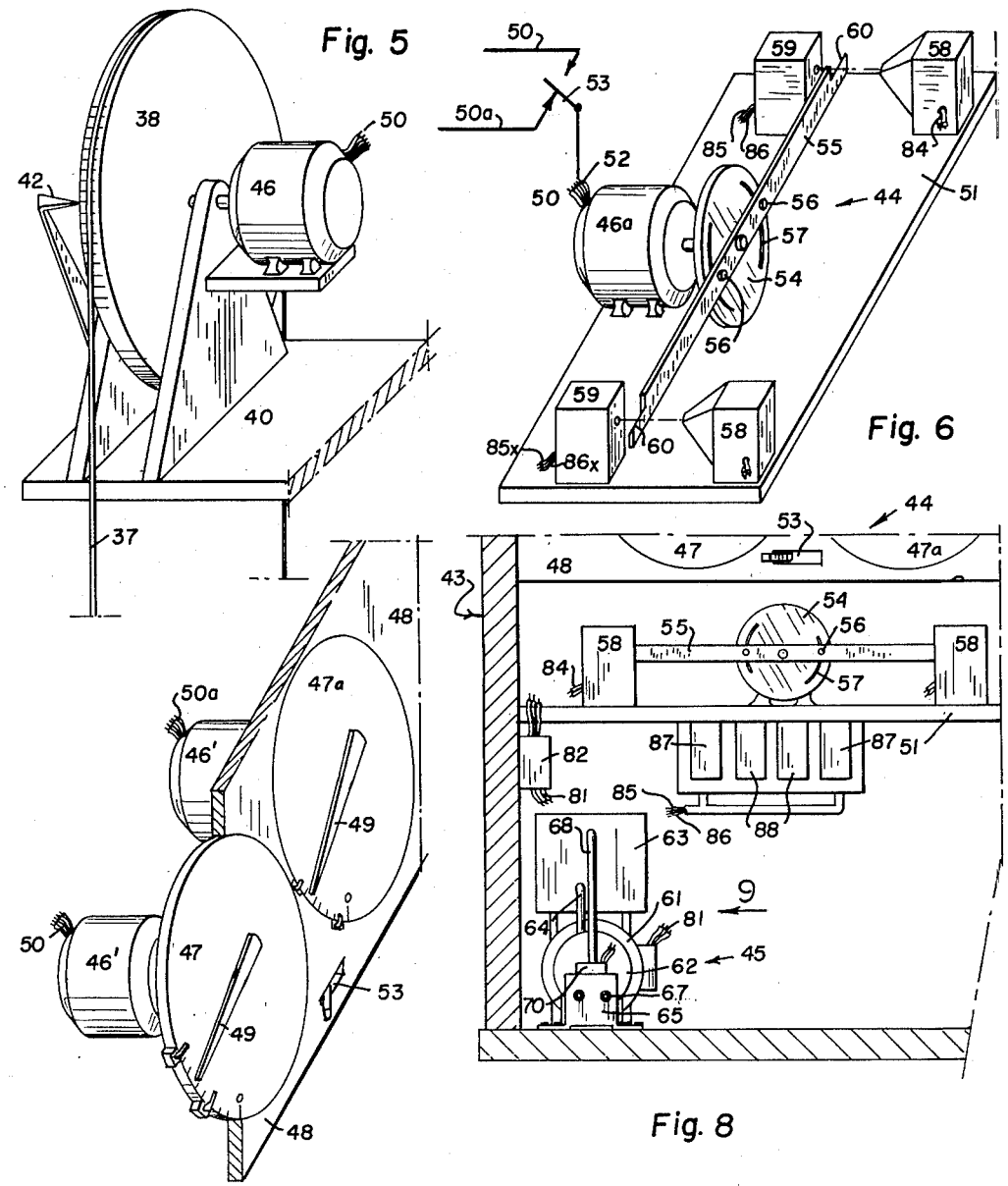
FIGURE 5 is a perspective view of a portion of the flow indicating apparatus at the gaging stations illustrated at FIGS. 2 and 3, as viewed substantially from the indicated arrow 5 at FIG. 2, but on an enlarged scale and modified over conventional arrangements in accordance with the principles of the invention.
FIGURE 6 is a perspective view of a selector of a type especially adapted to be incorporated into the invention at the control station illustrated at FIG. 4, as viewed substantially from the indicated arrow 6 at FIG. 4, but on an enlarged scale.
FIGURE 7 is a perspective view of flow indicators adapted to be incorporated into the invention at the control station as viewed substantially from the indicated arrow 7 at FIG. 4, but on a further enlarged scale.
FIGURE 8 is a fragmentary sectional elevation view of the control station illustrated at FIG. 4 and showing a preferred arrangement of the selector and other elements incorporated therewith, as taken substantially from the indicated line 8—8 at FIG. 4, but on an enlarged scale.

A preferred means of transmitting the basic float movement to the central control shed 43 is with selsyn motors 46 which are conveniently used in pairs or groups at spaced locations to provide an interconnected system wherein any rotational movement of the shaft of one motor is precisely duplicated by a like rotation movement of the shaft of the remote motor. A selsyn motor 46 is operatively connected to the shaft of each wheel 38 to register the rotation thereof as slight changes of float position occur due to changes in the flow rate of the channel or ditch. Indicator gages 47 and 47a to follow this movement are mounted in the central station 43 upon a suitable backboard 48 with one gage 47 indicating river flow and the other gage 47a indicating ditch flow. A selsyn motor 46' is mounted behind the board 48 and behind each gage 47 and 47a and the shaft thereof carries the balanced indicator pointer 49 as clearly illustrated at FIG. 7. The selsyn motor 46' at the river gage 47 is connected with a selsyn motor at the river gaging station 31 as by a group of circuits 50 and the selsyn motor 46' at the ditch gage 47a is connected to the selsyn motor at the ditch gaging station 32 by a group of circuits 50a. By proper calibration of the gages 47 and 47a the flow of both the channel and ditch may be observed in the control station 43 at all times.

When an irrigation ditch diverts water from a river it will usually be in such a manner as to require either a steady diversion flow into the ditch while passing a variable flow down the river or a passing of a steady flow down the river while diverting a variable flow into the ditch, as hereinbefore set forth. In either situation control of the regulating gate 26a in accordance with the present invention must be such as to hold the steady flow in the ditch or river, whichever is the selected steady flow channel, hereinafter so designated, by automatic movement of the gate 26a as the river supply varies. The movement of the gate is monitored by the flow gaging apparatus at the gaging station, 31 or 32, at the selected steady flow channel and the gate raises or lowers to compensate for any slight increase or decrease of the flow in the steady flow channel.

Such increases or decreases from steady flow are picked up by the gaging station apparatus and are relayed by the selsyn motors 46 to the central station 43. Such movements of the selsyn motors 46 actuate the regulator apparatus 44 through switching means and the regulator apparatus starts and stops the gate lifting machinery 45 as hereinafter set forth. The switching means includes a selsyn motor 46a which is centrally mounted upon a table 51 at the control station 43. This selsyn motor 46a is powered by a group of circuits 52 which may be interconnected with either the circuit group 50 or the circuit group 50a as by a throw-over toggle switch 53 to properly interconnect the selsyn 46a with the circuits of the selsyn 46 at the selected steady flow channel. This toggle switch 53 is illustrated as being manually operated although it may be operated automatically to throw, for example, from river steady flow to ditch steady flow whenever the river flow increases sufficiently. However, while ordinary river flow will vary constantly, most variations, within a short period of time, are ordinarily not large enough to require changeovers as from constant river flow to constant ditch flow more than once every few days and such changeovers are usually not permitted except with administrative orders and thus are necessarily manual operations.

The selsyn motor units conveniently available will faithfully reproduce remote movement providing there is no significant unbalanced torque forces on the selsyn shafts. Therefore, the selsyn motor 46a cannot be used to physically contact and open or close circuit switches where a measurable force is required to effect the operation thereof. In preferred construction, switches are controlled by cutting off light beams in a manner in which no torque force whatsoever is required. A disc 54 is mounted upon the shaft of the selsyn motor 46a and a carefully balanced interrupter arm 55 is mounted upon the disc and set in proper position by lock bolts 56 extending through the arm and into radial adjusting slots 57 in the disc. A pair of beam lamps 58 is mounted upon the table with each lamp near an end of the arm 55 and a pair of electric eye switches 59 is mounted upon the table in opposition to the beam lamps to normally receive the light beams unless interrupted by the ends of the arm 55. Each electric eye switch 59 is normally adapted to remain open when a beam of light strikes it, but to close when the light beam is cut off and the arm 55 is adjusted so that it is normally in a horizontal position with the light beams flashing over the end portions 60 of the top edge of the arm. Either beam will be cut off from its eye by the slightest movement of the arm. This edge 60 may be sharpened to provide more sensitive adjustment and may be adjustable in any conventional manner, not shown.

The electric eye switches 59 are connected with time delay switches through circuits, hereinafter described, to operate the gate lifting machinery 45. This machinery 45 is a conventional arrangement of conventional elements which includes a motor 61, a pump 62 connected therewith, a fluid reservoir 63, a line 64 connecting the reservoir and pump intake, and a four-way valve 65 having an intake line 66 from the pump discharge, working lines 67 and 67x to each end of the double acting cylinder 30 and a discharge line 68 returning to the reservoir 63. The intake line 66 includes a throttle valve 69 to regulate the rate of flow through the lines and speed of the gate movement. The four-way valve 65 is a conventional type adapted to shift pressure flow to the top or bottom of the gate cylinder to lower or raise the gate and this valve is controlled by solenoids 70 and 70x interconnected with circuits inhereafter described.

Any operation which would simply interconnect the electric eye switches 59 with the controlling machinery would be inoperative because of a condition sometimes referred to as hunting, a continuous reversing of the control gate movement because the control signals at the gaging station are received after a flow change which initiates the signals by a shift of the gate. This time delay or lag is illustrated graphically by the discharge-time coordinates of the chart FIG. 13. The solid line curve 71 represents a typical variation of flow into the channel at the gate 26a when the gate is in fixed position, as might be caused by a like variation of the river supply changing the water level elevation in forebay 22. The broken line curve 72 represents the same flow in the channel at the gaging station further downstream. The time lag L between the variations of flow at the gate and at the gaging station is substantial and may be five minutes or more. Although this time lag L will vary somewhat depending upon the quantity of flow in the channel it can be determined within reasonable limitations by simple field tests. The method of operation in accordance with the invention uses a time interval which approximates or preferably exceeds the lag L as hereinafter set forth.

In physical operation, the apparatus hereinbefore described is necessarily insensitive to a small range of variation of flow at the gaging station. For example, there is a certain amount of frictional drag which renders the equipment insensitive to very slight changes in the water level in the well 35. Also, very slight movements of the arm 55 will not operate the electric eye switches. This variation of flow at the gaging station is a minor factor and is seldom more than a small percentage of total flow. Moreover, the variation of the regulator apparatus is even less. It is a tolerance factor T (FIG. 13) and any flow variation within this limit may be considered for practical purposes as a steady flow.

Figure 13:
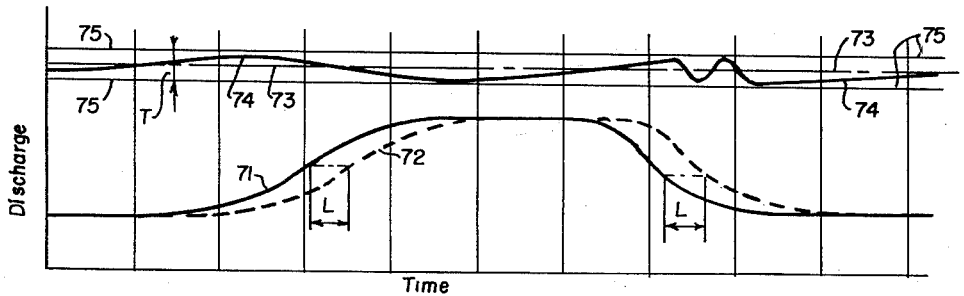

This effect of the tolerance factor is also illustrated graphically at FIG. 13 by the curves representing discharge which are distorted to better illustrate the action. A theoretical steady flow is represented by line 73, but the actual flow 74 will vary slightly. However, this variation cannot be detected as long as it is within the tolerance limits T of the apparatus, represented by tolerance lines 75 which lie in spaced parallelism, one at each side of the theoretical flow line 73. The physical variations of actual flow 74 which do not effect the apparatus may either be caused by slight variations in the river supply or by slight movements of the control gate. The method of operation in accordance with the invention takes advantage of this tolerance factor and uses a stepping movement of the control gate wherein each step movement of the gate changes the flow in the channel only a slight amount and less than that which would be represented by the spacing of the tolerance lines 75, so that, in effect the gaging apparatus may be insensitive to a single step-movement of the gate.

Therefore, the operation of the gates according to my improved method for obtaining a steady flow in the selected channel, regardless of the supply condition at the headworks is basically to compensate for variations at the headworks by gate movement according to indications at the gaging station, but with gate movements being in small increments and at selected time intervals between each movement. Each increment of movement changes the flow in the channel an amount less than that indicated by the spacing of the tolerance lines 75, and each individual gate movement is spaced from the prior gate movement by a time interval which exceeds the lag time between a change of flow at the gate and the same change at the gaging station in the channel.

Figure 14:
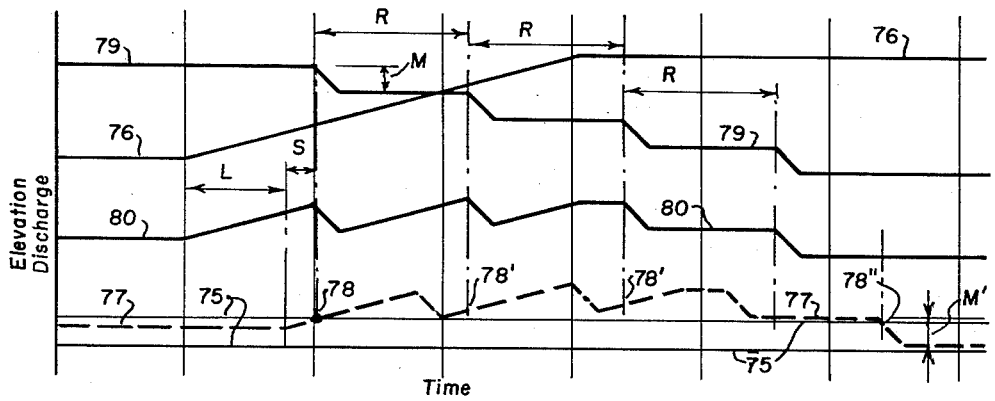
Figure 15:
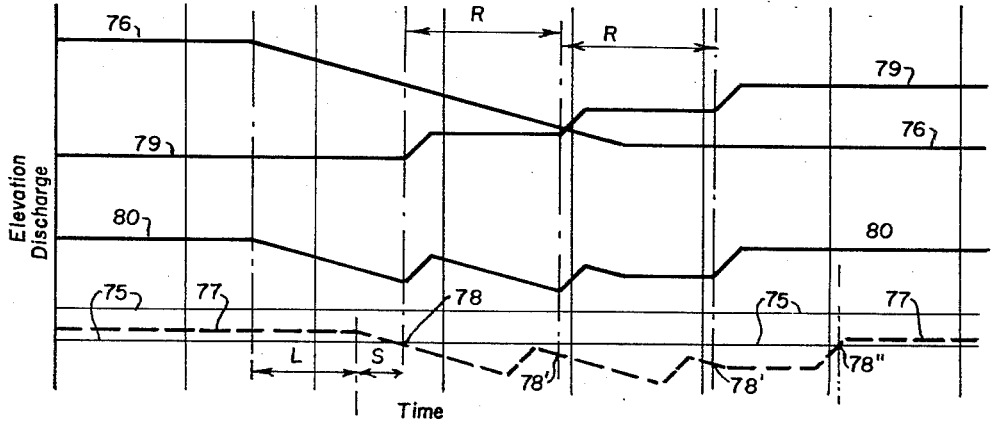

The operation according to the improved method is graphically illustrated at FIGS. 14 and 15 wherein various relationships are presented with respect to time. The description will be referred to an operation where the ditch 23 is operated as a steady flow channel and the river 20 downstream from the forebay 22 as being the variable flow channel. A supply curve 76 represents the river flow supply or the water level at the forebay 22 which affects the flow through the gate. The supply 76 is illustrated in FIG. 14 as commencing as a steady state condition, then increasing and finally returning to a steady state condition. It is illustrated in FIG. 15 as commencing as a steady state condition then decreasing and finally returning to a steady state condition. Such variations are fundamental and representative of any of the more complex variations which would occur in the channel system.

When the apparatus as hereinafter further described is set to maintain steady flow in the ditch and the tolerance lines 75 are established. The true flow 77 in the ditch at the gaging station will not register upon the apparatus when it remains within the tolerance limits between lines 75. For all practical purposes, the true flow will be considered as a steady flow, because these variations, within limits of ordinary flow measurement cannot be detected. However, when the supply condition 76 changes significantly a corresponding change of the true flow 77 will occur in the ditch and it will eventually shift outside the tolerance lines 75.

The apparatus then reacts to compensatingly shift the position of the control gate. The time delay for this reaction of the changing supply curve will include the time lag factor L and a smaller time factor S to move the true flow 77 across a tolerance line as at 78. Then the apparatus commences to operate as to close the gate in the case of an increasing supply as at FIG. 14 or to open it in case of a decreasing supply as at FIG. 15.

The gate movement is indicated by the curve 79 and the flow through the gate is represented by the curve 80. The flow through the gate changes immediately by change of the gate position. The gate movement however, is restricted and after a selected small movement M the gate stops and does not move again until the passing of a selected time interval R which is at least approximately and preferably somewhat greater than the time lag L. While the flow 80 through the gate will change as the gate position changes, as to decrease as the gate closes or increase as it opens, it will also change in accordance with the changing of the supply conditions 76 through the remainder of the time period R.

As soon as the selected period R terminates if the flow 77 at the gaging station is outside the tolerance lines as at 78' the gate will again operate to lower or raise to repeat the cycle, moving a small amount and remaining at another position for a selected period R. Should the true flow 77 be out of the tolerance lines 75 as at 78' at the end of this period the gate is again shifted and the cycle repeated.

This operation terminates shortly after the supply conditions represented by curve 76 return to a steady state, for whenever the true flow 77 is outside of the tolerance lines it will operate to shift the gate and the resulting flow 77 toward the tolerance lines and into the tolerance lines and when the true flow 77 crosses the tolerance lines as at 78" further shifting of the gate ceases.

This condiiton illustrated at FIG. 14 emphasizes graphically the desirability for limiting the gate movement M so that the change of measured flow M' by this gate movement must be less than the change indicated by the spacing of the tolerance lines 75. If the change M' were substantially greater than the tolerance factor T the flow 77 would shift from one side of the tolerance lines 75 to the other side and commence undesirable hunting.

Figure 11:
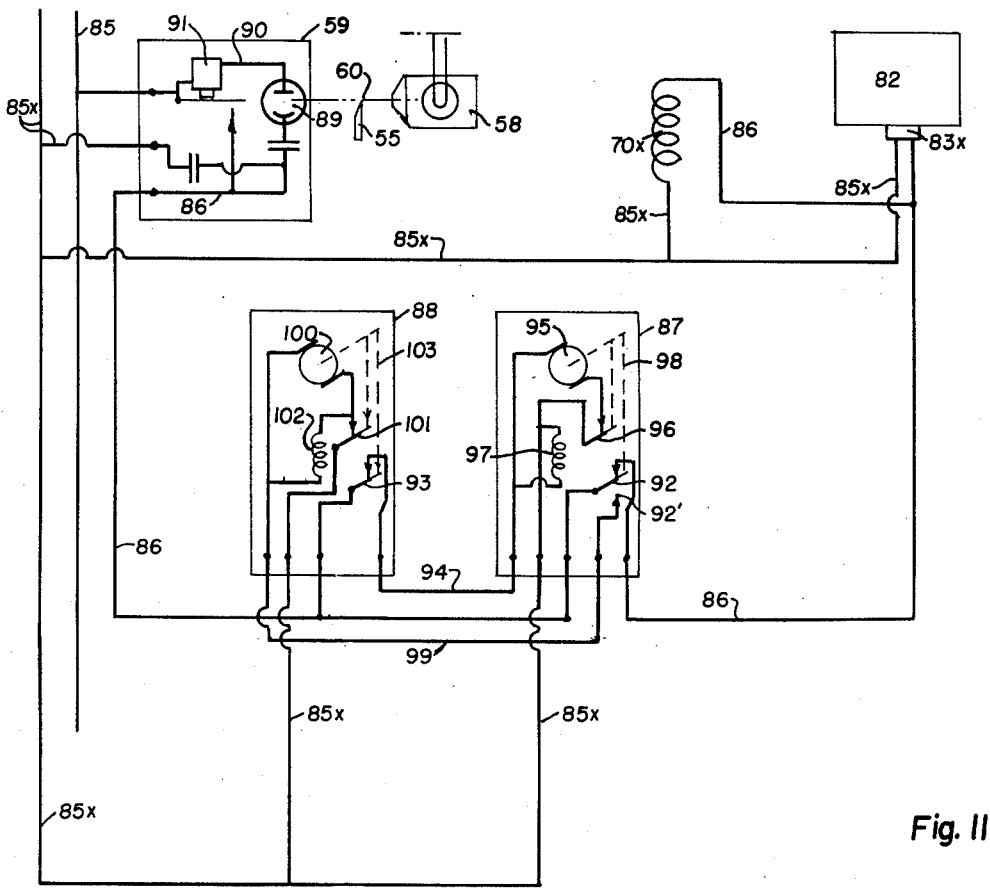
FIGURE 11 is an electrical diagram of the controls and interconnecting leads of one component portion of the arrangement set forth at FIG. 10.

A preferred group of operative circuits to control this unique gate action is illustrated at FIGS. 10 and 11. The motor 61 is operated by a power circuit 81 which may be either a single phase or three-phase source and this circuit preferably includes a starter switch indicated by box 82 of a type which includes two starter coils 83 and 83x. The lamps 58 may be operated by a simple single-phase circuit indicated by leads 84 and these lights will remain on at all times during the operation of the apparatus.

The primary control circuit is a single-phase power source as from leads 85 and 85x. These leads interconnect with each electric eye switch 59 for operation of the switches and with a closing lead 86 extending from one switch and a closing lead 86x extending from the other switch. The lead 85 and closing lead 86x connect with the solenoid 70 and starter switch 83 in parallel to initiate operations to raise the gate 26a whenever switches, hereinafter described, are closed.

Each closing lead 86 and 86x is controlled by the electric eye switch 59 and also by a timer switching arrangement so that whenever the electric eye switch closes as by a movement of the arm 55 responsive to an unbalanced flow condition at the gaging station, the circuits to the selected solenoid and motor switch will close for a short period to permit only a limited gate movement M and then remain open to prevent further movement for the selected restricted time interval R. For easy adjustments and setting of the time interval for gate movement and the subsequent time interval of no gate movement, it is desirable to provide a pair of timer devices, a short-interval timer 87 for setting gate movement and a long-interval timer 88 for setting the holding interval. These timers are of a conventional type having a time-interval-establishing motor, switches operable by the motor and a reset-holding coil adapted to hold and reset the apparatus responsive to electrical impulses, all in an arrangement now described.

The detailed circuit illustrated at FIG. 11 is for one side of the operation as for lowering the gate, and the other circuit for raising the gate is not shown since it is substantially identical to the circuit illustrated except for an alternaton of the power lease 85 and 85x and the use of the closing lead 86x instead of the lead 86. The electric eye switch includes a light sensitive eye 89 in a circuit loop 90 connecting leads 85 and 85x, including a relay 91. The switch of the relay 91 interconnects the power lead 85 with the closing lead 86 whenever the light source from lamp 58 is cut off from the eye 89 as by movement of arm 55. The closing lead 86 then becomes a continuation of the power lead 85.

One branch of the closing lead 86 extends to an initially closed continuation switch 92 in the short-range timer 87 which closes the circuit 86 to the motor starter 83x and solenoid 70x. The lead 86 includes another branch which extends to an initially closed motor circuit switch 93 in the long-range timer and thence to the short-range timer as a motor circuit 94 that operates a motor 95 therein. The motor circuit 94 also includes a cutout switch 96 in the timer 87 and from thence extends to connect with a leg of the lead 85x. A holding coil 97 in the short-range timer 87 shunts the motor 95 and switch 96 in circuit 94.

As an initial phase of operation, which occurs whenever the electric eye switch of relay 91 closes, and with switches 92, 93 and 96 initially closed, the motor 95 starts and after a selected short time period a mechanical cutout 98, indicated by the broken lines, opens switches 96 and 92 to open the circuit 86 beyond the timer for stopping motor 61 and resulting gate movement. The opening of switch 96 stops operation of the motor 95 but the holding coil 97 remains energized to hold the switches 96 and 92 in their depressed position.

When the throw arm of switch 92 is depressed it contacts the switch head 92' of a starter circuit 99 which extends to the long-range timer 88 and interconnects with motor 100 therein. The circuit 99 continues through a cutout switch 101 to the power lead 85x. A holding coil 102 in the timer shunts the motor 100 to operate simultaneously therewith.

When the short-range gate moving cycle is completed the long-range motor switch circuit is closed by switch 92 and the long-range motor 100 commences to operate. After a selected time interval mechanical cutout 103, indicated by broken lines, opens the switches 93 and 101. The opening of switch 93 opens circuit 94 to release the holding coil 97 of the short-range timer and permit the switches of that timer to return to their initial position. At the same time the circuit 99 is opened by the opening of switches 92′ and 101 to stop the motor 100 and open holding coil 102 to return all components back to their initial positions. The cycle will then be repeated if the electric eye switch 91 still closes circuits 85 and 86, but operation will cease the instant this switch 91 is opened as when the flow conditions balance themselves.

Figure 12:
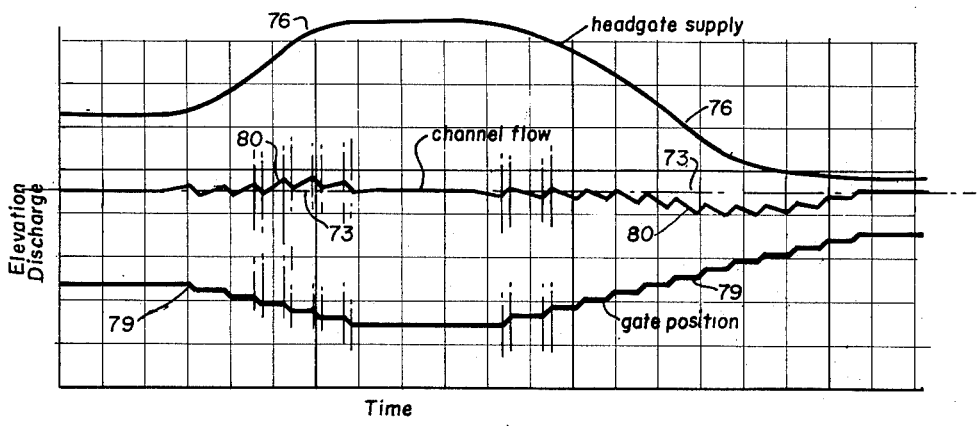

Operation of the apparatus provides for a flow control in a selected steady flow channel somewhat in the manner illustrated by the diagram at FIG. 12 wherein relationships are illustrated with respect to time. The supply conditions are illustrated as varying as by the curve 76 which commences with a steady state condition, then increases, then levels off, then decreases and again levels off. The gate movement illustrated by curve 79 shows the stepping action to close the gate responsive to increase of headgate supply and then opens the gate responsive to decrease of the headgate supply, as hereinbefore set forth. The flow in the channel at the gate is indicated by curve 80 and this flow deviates somewhat from the setting of a steady flow, indicated by dashed line curve 73, as seen from the diagram. However in each instance, the variation is not large and the actual flow 79 returns to the set steady flow shortly after a disturbance of the headgate condition.

It is to be noted from this description that no attempt has been made to set forth the relationships shown in the charts of FIGS. 12, 13, 14 and 15 in a quantitative manner, for it is immediately apparent to one skilled in the art that the quantitative values of the various factors discussed will vary at each location, but that such may be quickly determined by simple tests. For example, the time intervals for gate movement and for delay may be established by operation of the timers 87 and 88 when an approximate value of the time lag L and the incremental gate movement is known without detailed experiments to determine these factors with precision.

While I have now described my invention in considerable detail, it is obvious that others skilled in the art can devise alternate and equivalent constructions and operations which are within the scope and spirit of my invention. Hence, I desire that my protection be limited, not by the details of construction and operation herein described, but only by the proper scope of the appended claims.

I claim:

1. In combination with a diversion ditch particularly adapted to receive a variable water supply at the head thereof having a flow regulating head gate and a flow measuring station downstream from the head a distance sufficient to eliminate the effect of turbulence upon said measuring station;

a control system particularly adapted to maintain a predetermined substantially steady flow in said ditch by automatic compensating reversible movements of said gate as the water level at the head varies, said control system comprising:

(A) fluid flow indicating means positioned at said measuring station for determining fluid flow in said ditch, said indicating means comprising:
(1) a float having one position when a condition of steady flow exists in said ditch and being movable in one direction from said one position in response to an increase in said flow and movable in another direction from said one position in response to a decrease in said flow;

(B) sensing means for responding to a change in the position of said flow indicating means comprising:
(1) a first circuit,
(2) a second circuit,
(3) an electric eye switch disposed in each of said first and second circuits and closeable to complete a respective one of said circuits whenever a beam of light is directed to a respective one of said eye swtiches,
(4) a shaft,
(5) balanced arm means positioned upon said shaft having opposing light cut-off edges disposed substantially adjacent to one of said eye switches, and,
(6) light beam producing means for directing a beam of light upon each of said eye switches, said arm means being so constituted and arranged as to normally position said edges in the path of said light beams, whereby said light beams are normally interrupted, and being rotatable in each of a plurality of directions, one edge being moved away from a corresponding light beam when said arm means rotates in one of said plurality of directions and the other edge being moved away from a corresponding light beam when said arm means rotates in another of said plurality of directions, whereby said light beam producing means will close one or the other of said electric eye switches responsive to the rotation of said balanced arm means from the normal position thereof and a corresponding one of said first and second circuit means;

(C) linkage means interconnecting the float and said shaft for maintaining said balanced arm means in the normal position thereof when the float is disposed in the one position thereof under conditions of steady flow and for rotating said balanced arm means in one of said plurality of directions responsive to movement of the float in said one direction and in another of said plurality of directions responsive to movement of the float in said other direction, thereby causing a corresponding one of said first and second circuits to be closed when said float moves in a corresponding one of said one and said other directions to a position other than the normal position thereof;

(D) actuator means for closing and opening said gate and for closing said gate when one of said first and second circuits is closed and for opening said gate when the other of said first and second circuits is closed, whereby the flow through said gate is reduced when said float moves in one of said one and said other directions to indicate an excess of flow through the ditch, and the flow through said gate is increased when the float moves in another of said one and said other directions to indicate a deficiency of flow through the ditch, and;

(E) movement limiting and time delay means positioned in each of said first and second circuits and being operatively associated with said actuator means for limiting the gate to relatively small increments of opening and closing movements at least equal to no more than a tolerance factor as defined by permissible relatively small variations of flow through said ditch in excess of and less than said substantially steady flow, in response to which variations said float remains in substantially its said one position and neither of said first and second circuits is energized, when closing of one of said electric eye switches initiates gate movement and for providing a predetermined time delay period between each increment of gate movement, said time delay period being at least equal to the time period required by any change in said substantially steady flow condition to be effective at said measuring station.

2. In the combination as defined by claim 1, wherein:
   (F) said shaft is remote from said float;
   (G) a primary shaft is positioned adjacent to and operatively connected with said float, and;
   (H) means is provided for rotating said first named shaft and said primary shaft in unison.

3. In combination with a diversion ditch adapted to receive a variable water supply at the head thereof having a flow regulating head gate and a flow measuring station downstream from the head a distance sufficient to eliminate the effect of turbulence upon said measuring station, a control system adapted to maintain a predetermined substantially steady flow in said ditch by automatic compensating reversible movements of the gate as the water level at the head varies comprising:
   (A) fluid flow indicating means positioned at the flow measuring station for determining fluid flow in said ditch, said flow indicating means comprising:
      (1) a float having a base portion when conditions of steady flow exist in said ditch and movable in one direction from the base position thereof responsive to an increase of said flow and in another direction responsive to a decrease of said flow;
   (B) sensing means for responding to a change in the position of said flow indicating means comprising:
      (1) a first circuit,
      (2) a second circuit, and
      (3) a normally open switch disposed in each of said first and second circuits;
   (C) linkage means operatively connected with the float and said switches for closing the switch of the first said circuit and energizing that circuit responsive to movement of the float in one of said first and said other directions from the base position thereof and to close the switch of the second said circuit and energizing that circuit responsive to movement of the float in the other of said one and said other directions from the base position thereof;
   (D) actuator means for closing and opening said gate and for closing said gate when one of said first and second circuits is closed and for opening said gate when the other of said first and second circuits is closed, whereby the flow through said gate is reduced when said float moves in one of said one and said other directions to indicate an excess of flow through the ditch, and the flow through said gate is increased when the float moves in another of said one and said other directions to indicate a deficiency of flow through the ditch, and;
   (E) movement limiting and time delay means in said sensing means and being operatively connected with said actuator means for limiting the gate to relatively small increments of opening and closing movements at least equal to no more than a tolerance factor as defined by permissible relatively small variations of flow through said ditch in excess of and less than said substantially steady flow, in response to which variations said float remains in substantially its said base position and neither of said first and second circuits is energized, when closing of one of the switches of said sensing means initiates gate movement and for providing a predetermined time delay period between each increment of gate movement, each increment of movement effecting only a minor change of ditch flow and each time delay period being at least equal to the time period required by any change in said steady flow condition to be effective upon the flow indicating means of said measuring station, said movement limiting and time delay means comprising:
      (1) a normally closed timer switch disposed in each of said first and second circuits for:
         (a) closing and remaining closed when a corresponding one of said first and second circuits is open and deenergized,
         (b) remaining closed for a first predetermined time whenever a corresponding one of said first and second circuits is energized,
         (c) opening the correspondingly energized circuit for a second selected time interval, and
         (d) thence to cyclically close and open the correspondingly energized circuit for said first and second time intervals as long as said correspondingly energized circuit remains energized, whereby said time intervals establish the aforesaid increments of gate movement and the delay periods between the relatively small increments of movement of said gate.

References Cited in the file of this patent

UNITED STATES PATENTS

| | | |
|---|---|---|
| 1,388,723 | Kennedy | Aug. 23, 1921 |
| 2,345,466 | Dias | Mar. 28, 1944 |
| 2,876,396 | Rush et al. | Mar. 3, 1959 |
| 2,892,133 | Huge | June 23, 1959 |

FOREIGN PATENTS

| | | |
|---|---|---|
| 429,696 | Germany | June 4, 1926 |
| 347,976 | Great Britain | May 7, 1931 |
| 465,946 | Great Britain | May 18, 1937 |